United States Patent
Strachan et al.

(10) Patent No.: US 12,480,399 B2
(45) Date of Patent: Nov. 25, 2025

(54) DRILL STRING ANGULAR OFFSET DETERMINATION

(71) Applicant: Halliburton Energy Services, Inc., Houston, TX (US)

(72) Inventors: Michael John Strachan, Conroe, TX (US); Pete Louis Schiermeier, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 516 days.

(21) Appl. No.: 17/938,195

(22) Filed: Oct. 5, 2022

(65) Prior Publication Data
US 2024/0117729 A1 Apr. 11, 2024

(51) Int. Cl.
*E21B 47/09* (2012.01)
*G01B 7/30* (2006.01)

(52) U.S. Cl.
CPC ............... *E21B 47/09* (2013.01); *G01B 7/30* (2013.01)

(58) Field of Classification Search
None
See application file for complete search history.

(56) References Cited

U.S. PATENT DOCUMENTS

| | | | |
|---|---|---|---|
| 5,084,980 A * | 2/1992 | Skopec | G01B 11/27 33/286 |
| 6,585,061 B2 | 7/2003 | Radzinski et al. | |
| 6,708,782 B1 * | 3/2004 | Turney | E21B 7/067 175/45 |
| 7,814,988 B2 | 10/2010 | Peter | |
| 10,323,504 B2 | 6/2019 | Gollehon et al. | |
| 10,626,683 B2 | 4/2020 | Hebebrand et al. | |
| 2008/0164025 A1 | 7/2008 | Peter | |
| 2012/0255780 A1 | 10/2012 | Schmidt | |
| 2014/0008125 A1 | 1/2014 | Hay | |
| 2015/0014058 A1 | 1/2015 | Wassell et al. | |
| 2016/0003863 A1 * | 1/2016 | Chau | G01P 15/00 73/152.46 |
| 2018/0195859 A1 | 7/2018 | Gollehon et al. | |
| 2018/0298743 A1 | 10/2018 | Sullivan et al. | |
| 2020/0072037 A1 * | 3/2020 | Wallis | E21B 47/022 |
| 2020/0224526 A1 | 7/2020 | Parmeshwar et al. | |

FOREIGN PATENT DOCUMENTS

CN 104234698 A * 12/2014
WO WO 2002/036824 A2 5/2002

OTHER PUBLICATIONS

Zhang et al., "Analysis and Optimization of Control Algorithms for RSSTSP for Horizontal Well Drilling," Journal of Petroleum Exploration and Production Technology, vol. No. 8, pp. 1069-1078, Apr. 13, 2018.

* cited by examiner

*Primary Examiner* — Daniel S Larkin (74) *Attorney, Agent, or Firm* — Benjamin Ford; Parker Justiss, P.C.

(57) ABSTRACT

Systems and methods to determine angular offset between reference points on a drill string are achieved automatically using an electronic device, such as a handheld device. A first orientation value corresponding to the first highside reference point is obtained using the electronic device. A second a second orientation value corresponding the second highside reference point is obtained. The electronic device then calculates the angular offset between the first and second orientation values.

20 Claims, 5 Drawing Sheets

DRILL STRING ANGULAR OFFSET DETERMINATION

FIELD OF THE INVENTION

The present invention relates generally to hydrocarbon exploration using directional drilling and, more specifically, to methods and systems to determine drill string angular offset using an electronic device.

BACKGROUND

One of the most common systems for drilling a deviated wellbore is a combination of a steerable motor and measurement-while-drilling ("MWD") tool. The angular offset, also referred to as the "rig floor offset" ("RFO"), between the motor highside (direction the motor will deviate the wellbore) and the MWD highside (tool measurement in relation to gravity or magnetic north) needs to be established so the driller steers the wellbore in the correct direction.

If the RFO offset is calculated or entered into the system incorrectly, the wellbore can be steered in the wrong direction. At best case, this can result in a sub optimal well path, worst case can be a Health, Safety and Environment ("HSE") risk if the wellbore is steered into an adjacent well.

Errors in the RFO offset may occur for a variety of reasons. Some include poorly transferred references along the length of the bottom hole assembly ("BHA"), measurements at the wrong location or tool, incorrect measurements, the wrong sign used (i.e., measure anti-clockwise instead of clockwise), errors in communication of the values, and errors in entering the information into the systems.

DESCRIPTION OF ILLUSTRATIVE EMBODIMENTS

Illustrative embodiments, systems and related methods of the present disclosure are described below as they might be employed to determine angular offset between reference points along a drill string. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the invention will become apparent from consideration of the following description and drawings.

Exemplary embodiments of the present invention are directed to systems and methods to determine angular offset between reference points on a drill string. In a generalized computer implemented method, an electronic device, such as a handheld device, is positioned adjacent a first highside reference point, such as for example a motor highside reference point. A first orientation value corresponding to the first highside reference point is obtained using the electronic device. The electronic device is positioned adjacent a second highside reference point (such as for example a MWD assembly highside reference point), and a second a second orientation value corresponding the second highside reference point is then obtained. The electronic device then calculates the angular offset between the first and second orientation values.

Although the present disclosure is described in reference to a motor and MWD assembly reference points, any other reference points along the BHA may also be used. For example, the reference points may be the centerline of a whipstock and an MWD. Another example would be the relative position of the blades of stabilizers. Based upon FEA analysis on a single stabilizer, the orientation, shape and number of blades on a stabilizer induce vibration into the BHA. An accurate measurement of the relative position of the blades on multiple stabilizers could allow the stabilizer induced vibration for all the BHA to be calculated and one can then determine the critical RPM's which would cause the BHA to resonate and generate damaging vibration.

Figure 1A:
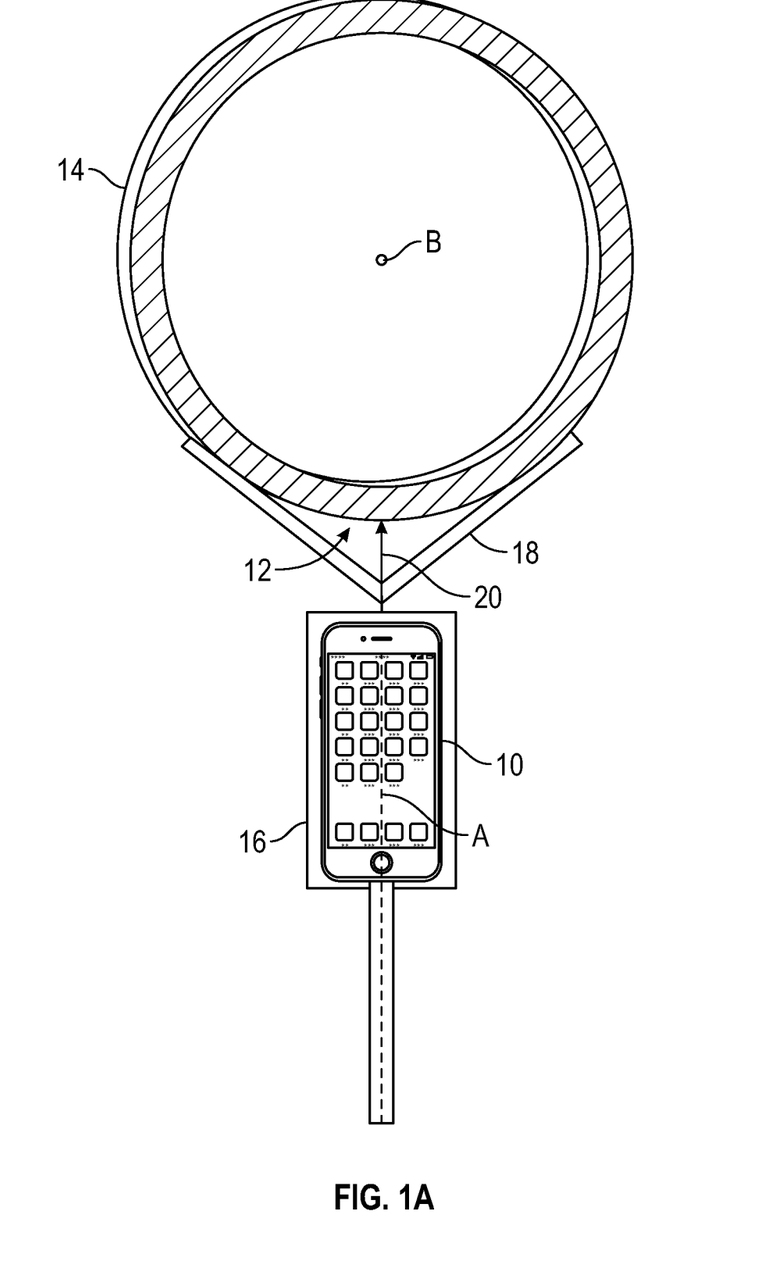
FIG. 1A is a sectional view of a drill string having an electronic device positioned adjacent thereto, according to certain illustrative embodiments of the present disclosure.

FIG. 1A is a sectional view of a drill string having an electronic device positioned adjacent thereto, according to certain illustrative embodiments of the present disclosure. The electronic device 10 may be a variety of processing devices such as, for example, a hand-held digital instrument, compass device or smart phone. Electronic device 10 may contain magnetometers, accelerometers, gyro sensors, rotational vector sensors, and/or a geo-positioning system ("GPS"). The various sensors inside electronic device 10 are used to obtain the orientation of electronic device 10 in relation to two or more locations (e.g., motor and MWD) on drilling string/BHA 14 to measure and record the angular offset between the two or more locations.

Electronic device 10 is positioned adjacent to and perpendicular to highside references 12 on the motor and MWD assembly along the drill string 14. As can be seen in FIG. 1A, axis A of electronic device 10 is perpendicular to axis B of drill string 14. The orientation values obtained by electronic device 10 are saved and processed to automatically calculate the RFO.

Figure 1B:
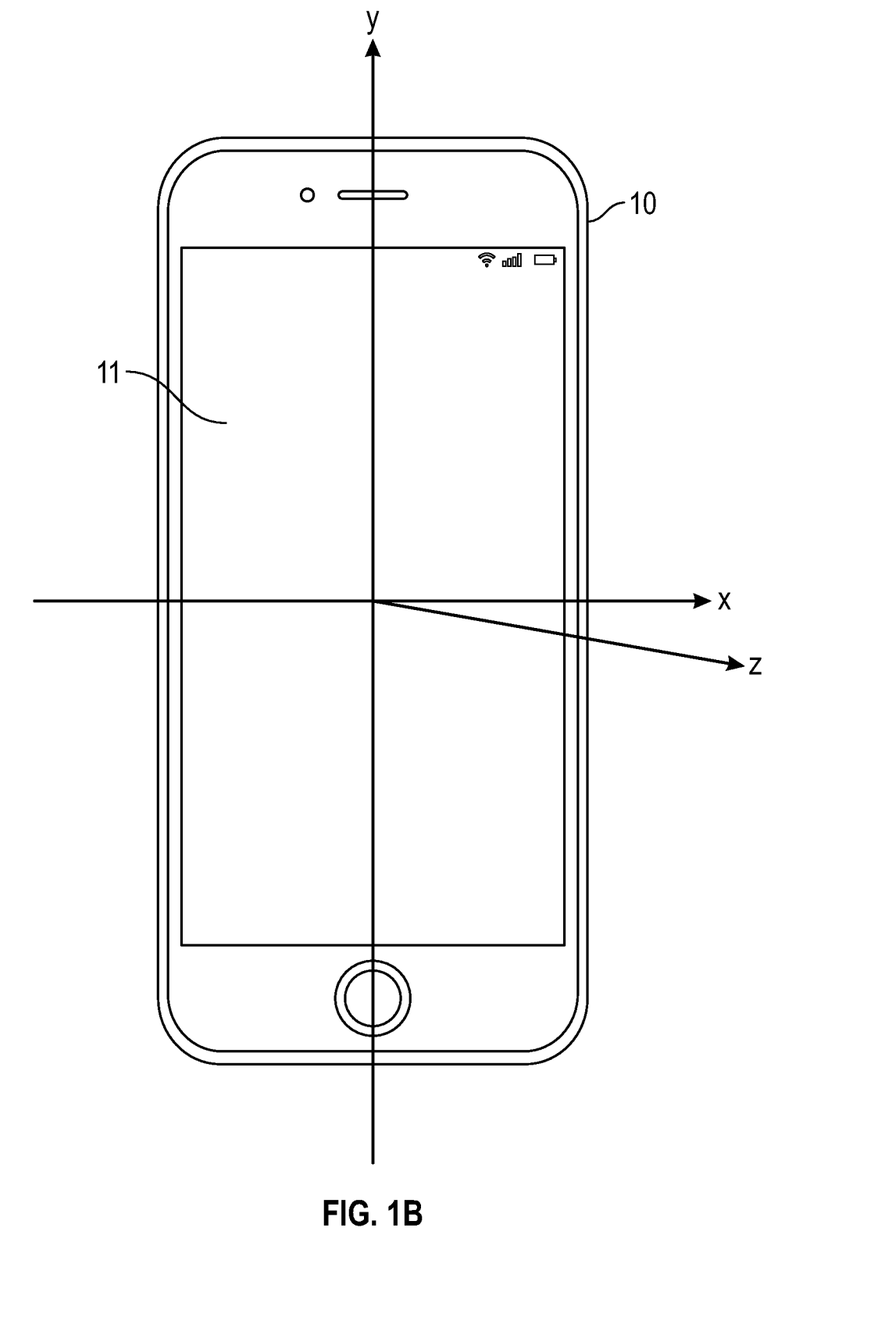
FIG. 1B is a perspective view of an electronic device, according to certain illustrative embodiments of the present disclosure.

FIG. 1B shows a perspective view of electronic device 10, along with its coordinate system (relative to device 10). In this illustrative example of electronic device 10, the sensor application programming interface ("API") is relative only to the natural orientation of the screen 11 (axes are not swapped when the screen 11 orientation changes). This embodiment allows placement of electronic device 10 against one reference point (scribe line) with one axis perpendicular to the collar. Then, the orientation may be read directly. As will be described in more detail below, when the second scribe line is accessible, device 10 is placed against the second reference point with the same axis perpendicular to the collar. That orientation is the read directly, and device 10 may then calculate the difference in angular offset.

As compared with conventional approaches, the present described approach does not require a need for device 10 to be attached to any reference point. There is no HSE risk of an object being attached to collars. Multiple reference points can now be measured directly. The device 10 does not need to be in close proximity to the BHA at all times. No special skills are required for personnel to use the device 10.

A variety of sensors are usable with electronic device 10 dependent on the environment. In certain embodiments, an optimum sensor may be auto-selected dependent on the stability of the magnetic environment and estimated gyroscope drift. In other embodiments, device 10 may also calculate the attitude using multiple methods and selecting either best fit or using one method to calibrate the others.

Sensors that may be used in one illustrative embodiment include accelerometers and gyroscopes (no magnetometer). A game rotation vector sensor is similar to a rotation vector sensor but not using the geomagnetic field. Therefore, the Y axis doesn't point north but instead to some other reference. That reference is allowed to drift by the same order of magnitude as the gyroscope drifts around the Z axis. In certain illustrative embodiments, a phone (used as the electronic device 10) can be rotated and returned to the same real-world orientation and should report the same game rotation vector.

In those embodiments of device 10 utilizing a rotation vector, the underlying physical sensors may include an accelerometer, magnetometer, and gyroscope. In one example, these sensors report an estimated heading accuracy in which the heading error must be less than estimated accuracy 95% of the time. This sensor must use a gyroscope as the main orientation change input. This sensor also uses accelerometer and magnetometer inputs to make up for gyroscope drift, and it cannot be implemented using only the accelerometer and magnetometer.

In those embodiments of device 10 utilizing a geomagnetic rotation vector, the underlying physical sensors may include accelerometers and magnetometer (no gyroscope). A geomagnetic rotation vector is similar to a rotation vector sensor, but using a magnetometer and no gyroscope. This sensor must be based on a magnetometer. It cannot be implemented using a gyroscope, and gyroscope input cannot be used by this sensor.

In those embodiments of device 10 utilizing orientation (deprecated) sensors, the underlying physical sensors may be an accelerometer, magnetometer and (if present) a gyroscope. This is an older sensor type that has been replaced by the rotation vector sensor, which is more clearly defined. Nevertheless, an orientation sensor reports the attitude of the device. The measurements are reported in degrees in the x, y and z fields of the sensor orientation.

In certain alternative embodiments, electronic device 10 may include a camera to capture images to assist in recording the positions at which the values were recorded. In yet other embodiments, electronic device 10 may include an RFID reader to scan a bar code to confirm the tool's (e.g., the motor or MWD assembly) identity. In other examples, electronic device 10 may also include text recognition capability to read equipment numbers placed on the BHA. Thereafter, in this example, processing circuitry within electronic device 10 calculates the angular offset using the obtained orientation values. The angular offset/RFO and the supporting information (e.g., images and/or bar codes) can then be transferred directly to the surface systems using a suitable communication link (wired or wireless).

Further, with respect to FIG. 1A, a holding device 16 may be used to orient electronic device 10 at a known axis in relation to the motor or MWD assembly of drill string 14. Holding device 16 provides a more accurate alignment of electronic device 10. In the example of FIG. 1A, electronic device 10 may be secured inside holding device 16 in a variety of ways such as, for example, an adjustable snap mechanism to lock the electronic device 10 in place inside the holding device 16. Holding device 16 also includes spring scribe line guide 18 which compensates for different diameters of drill string 14. Spring scribe line guide 18 is used to position electronic device 10 at a known orientation from drill string 14 so that the technician can accurately place the scribe line repeatedly. In certain other embodiments, electronic device 10 may also include a light 20 (e.g., laser) which projects a scribe line on the surface of drill string 14, which can then be traced by the technician.

Figure 2:
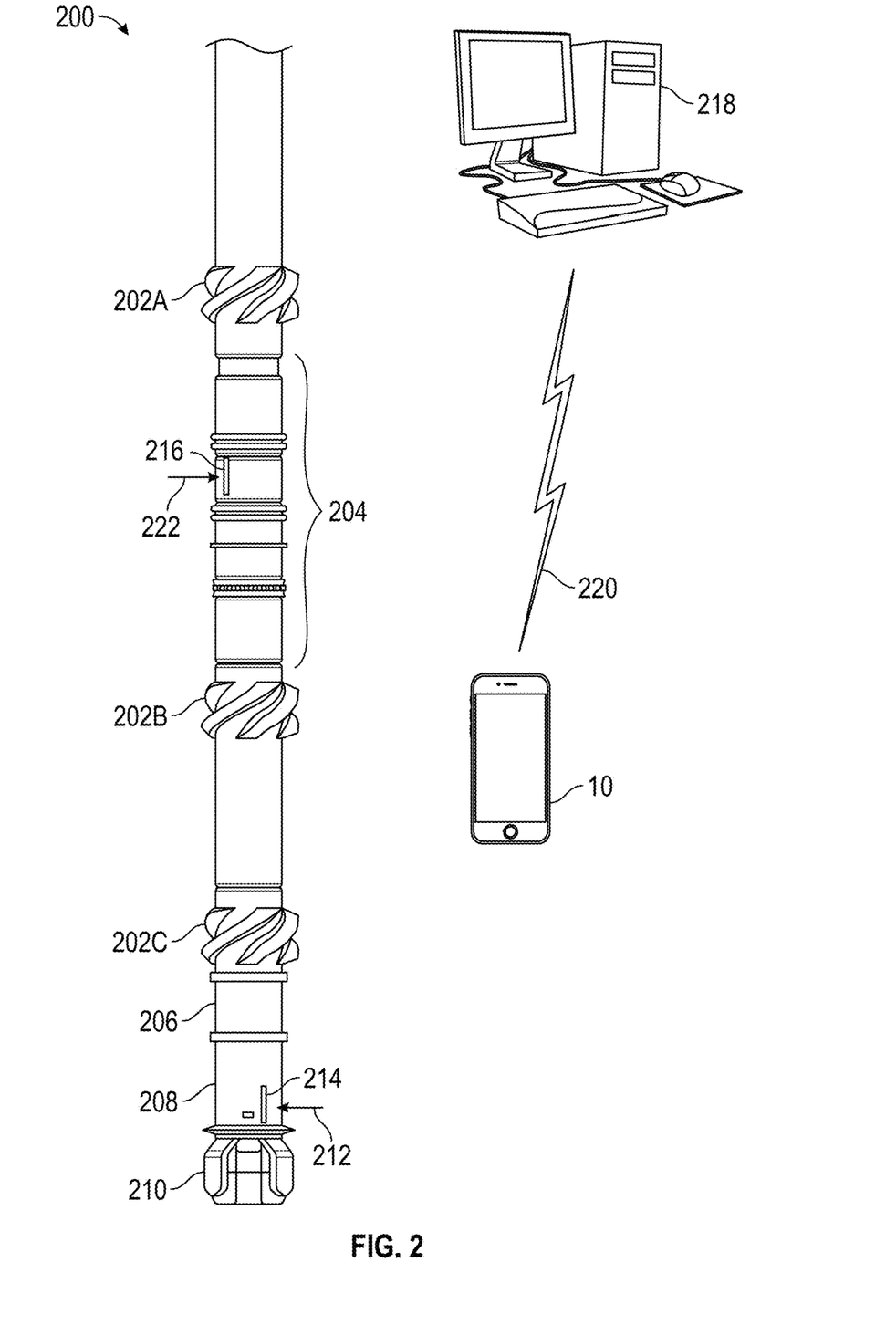
FIG. 2 is a side perspective view of a BHA of a drill string, according to certain illustrative embodiments of the present disclosure.

FIG. 2 is a side perspective view of a BHA of a drill string, according to certain illustrative embodiments of the present disclosure. BHA 200 includes a stabilizer 202A, 202B and 202C. An MWD assembly 204 is positioned between stabilizers 202A and 202B. A sub 206 is positioned below stabilizer 202C. Motor 208 and drill bit 210 are positioned below sub 206. During drilling preparations, as BHA 200 is lowered through the rig floor (not shown), and a scribe line 214 is inscribed (by tech personnel) on motor 208 at the location of the motor high side reference point 212. The well path will be created in the direction the motor highside reference point 212 is oriented. Electronic device 10 is positioned adjacent the scribe line 214 of motor highside reference point 212 to obtain a first orientation value corresponding to the location of motor highside reference point 212. Here, electronic device 10 directly digitally measures the position of the reference point.

Thereafter, BHA 200 is lowered through the rig floor and a scribe line 216 is placed at MWD highside reference point 222 of MWD assembly 204. The electronic device 10 is then placed adjacent the scribe line 216 of MWD highside reference point 222 in order to obtain a second orientation value corresponding to the MWD assembly highside reference point 222. Electronic device 10 directly digitally measures the position of reference point 222.

Electronic device 10 then automatically calculates the angular offset between the first and second orientation values. The calculated angular offset is then transmitted to surface system 218 via communication link 220 (which may be wired or wireless). Surface system 218 decodes the MWD signals and, using the measured offset between the two reference points, outputs the orientation of the motor highside which is then used to steer the well in the desired direction.

Figure 3A:
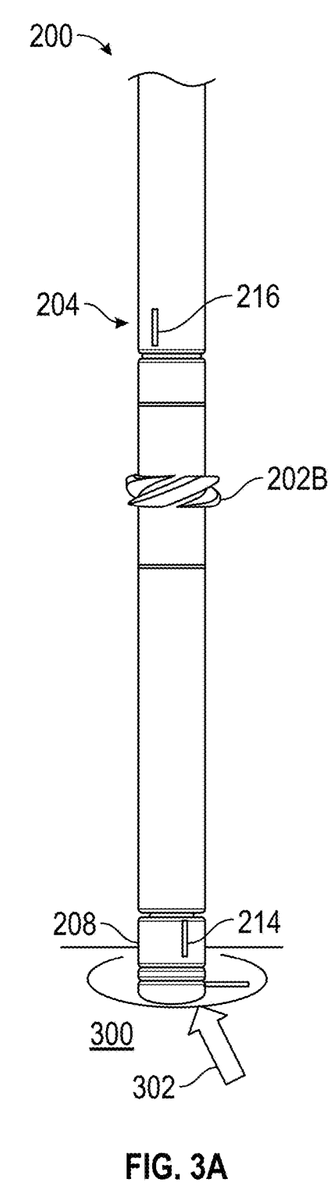
FIGS. 3A, 3B and 3C illustrate an alternative method of the present disclosure.
Figure 3B:
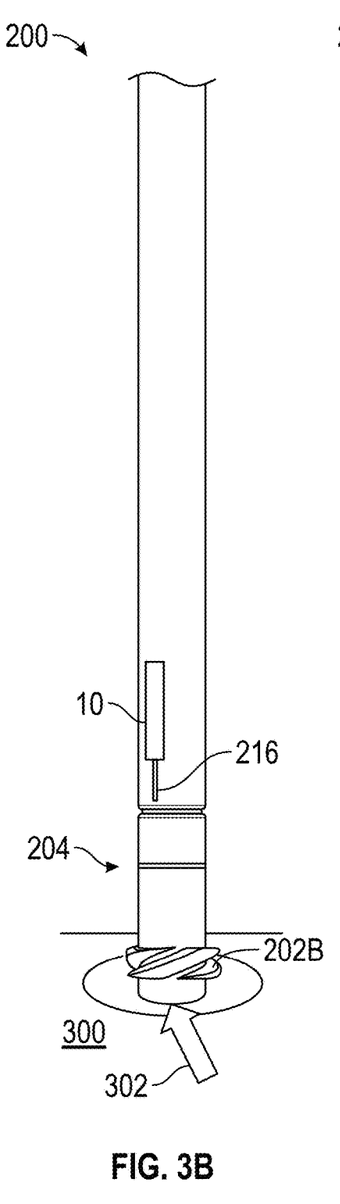
Figure 3C:
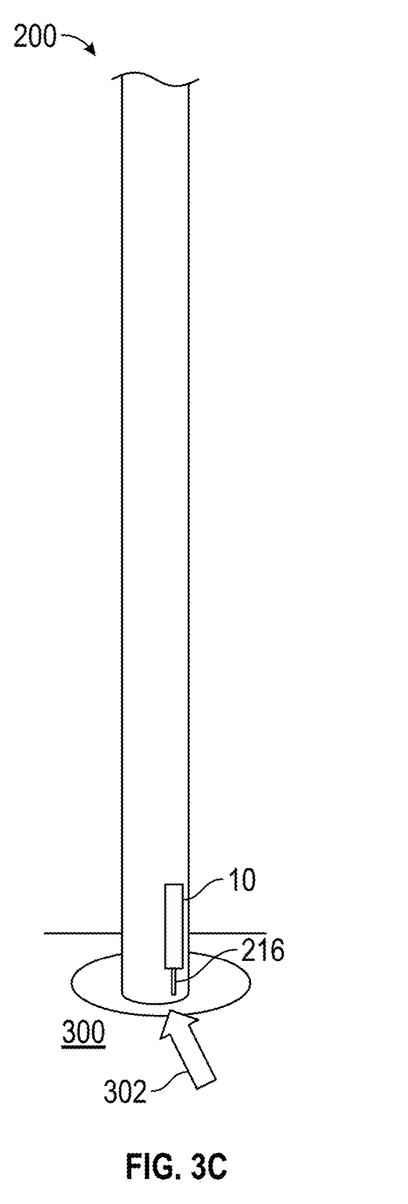

FIGS. 3A-3C illustrate an alternative method of the present disclosure. Like FIG. 2, FIGS. 3A-3C illustrate BHA 200 as it is being lowered through the rig floor 300. Here, first scribe line 214 is placed on BHA 200 which corresponds to the motor highside. First scribe line 214 is then placed level with rig floor 300 and a rig floor scribe line 302 is placed on the rig floor. The rig floor scribe line 302 is placed in line with first scribe line 214, as shown in FIG. 3A. BHA 200 is then lowered until second scribe line 216 (which corresponds to the MWD assembly highside reference point 222) is adjacent the rig floor 300. The electronic device is then attached to BHA 200 in line with MWD assembly highside reference point 222/scribe line 216. The position of scribe line 216 is then recorded as a first orientation value. Thereafter, the BHA 200/drill string is rotated until scribe line 216 is aligned with rig floor scribe line 302. Once the two scribe lines are aligned, the position of the electronic device 10 is then recorded as a second orientation value.

Thereafter, electronic device calculates the angular offset between the two orientation values, as previously described.

Figure 4:
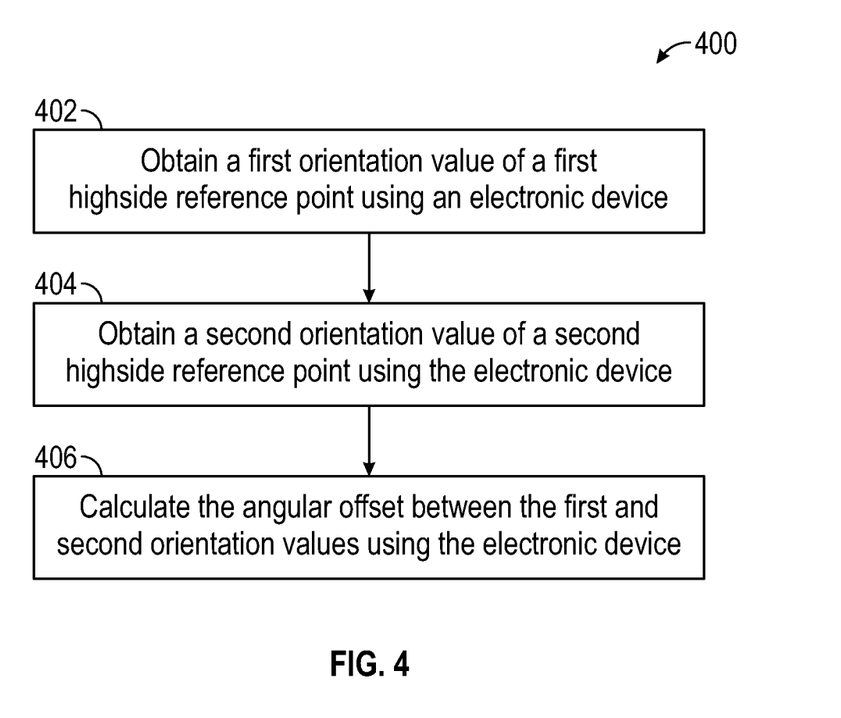
FIG. 4 is a flow chart of a method for determining the angular offset between two or more reference points on a drill string, according to certain illustrative embodiments of the present disclosure.

FIG. 4 is a flow chart of a method for determining the angular offset between two or more reference points on a drill string, according to certain illustrative embodiments of the present disclosure. At block 402 of method 400, an electronic device (such as electronic device 10) is positioned adjacent a motor highside reference point. A first orientation value corresponding to the motor highside reference point is obtained using the electronic device 10. At block 404, the electronic device 10 is placed adjacent a MWD assembly highside reference point, and a second orientation value corresponding the MWD assembly highside reference point is obtained. At block 406, the electronic device 10 automatically calculates the angular offset between the first and second orientation values. During periods when the measurements are taken, the ray sensor data may be captured and stored to allow quality assurance/quality control of the measurements (either on the device or subsequently after the data has been transferred). The angular offset may then be used to perform drilling or geosteering operations.

In alternative methods of the present disclosure, the described method can be applied to any reference point/station on the BHA to determine an offset. That reference point/station can be used to measure an offset to any element/component in the BHA such as, for example, a stabilizer (e.g., eccentric stabilizer/pad) or orientation of stabilizer blades (e.g., straight blade stabilizers). Further offset measurements can be made at more than one position in the BHA such as, for example, the highside reference point of the MWD or at a different reference point elsewhere in the BHA such as, for example, at the top of the BHA with a scribe line on an orientation sub for a deployable orientation sensor such as, for example, a gyroscope or magnetic orientation sensor.

The processing circuitry included in the computing devices described herein (e.g., electronic device 10, surface system 218) may be implemented as a computer, phone, PDA, or any other type of electronic device. Such an electronic device includes various types of computer readable media and interfaces for various other types of computer readable media. The computing system may include a permanent storage device, a system memory, an output device interface, a system communications bus, a read-only memory (ROM), processing unit(s), a input device interface, a network interface, etc. From these various memory units, the processing unit(s) retrieves instructions to execute and data to process in order to execute the processes of the subject disclosure. The processing unit(s) can be a single processor or a multi-core processor in different implementations.

The bus of the computing system may couple it to a public or private network (not shown) or combination of networks through a network interface. Such a network may include, for example, a local area network ("LAN"), such as an Intranet, or a wide area network ("WAN"), such as the Internet.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a non-transitory machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, the steps of processes described above may be implemented using system or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In view of the foregoing, the systems and methods described herein provide a number of advantages. The systems and methods reduce the non-productive time/cost of poor quality (NPT/COPQ) that can occur when it is necessary to correct the wellpath. HSE risk can be reduced by avoiding unplanned close approaches to another well. The accuracy of the RFO measurements are improved; the time required to take the RFO measurements is reduced; the source of many errors associated with conventional RFO methods is reduced. Further, the methods described herein reduce the number of personnel required for drilling operations by providing a method of measurement that requires little training; Lastly, the described methods do not require items to be attached to the outside BHA and lifted above the head height of personnel, hence avoiding possible HSE risks.

Embodiments and methods of the present disclosure described herein further relate to any one or more of the following paragraphs:

1. A computer-implemented method for determining an angular offset between reference points on a drill string, the method comprising positioning an electronic device adjacent a first highside reference point; obtaining, using the electronic device, a first orientation value corresponding to the first highside reference point; positioning the electronic device adjacent a second highside reference point; obtaining, using the electronic device, a second orientation value corresponding the second highside reference point; and calculating, using the electronic device, an angular offset between the first and second orientation values.

2. A computer-implemented method as defined in paragraph 1, wherein the first highside reference point is a motor highside reference point; and the second highside reference point is a measurement-while-drilling ("MWD") assembly highside reference point.

3. The computer-implemented method as defined in paragraph 1 or 2, wherein the electronic device is a hand-held device.

4. The computer-implemented method as defined in any of paragraphs 1-3, wherein the electronic device comprises at least one of a magnetometer, accelerometer, gyro, rotational vector sensor, or global positioning system ("GPS").

5. The computer-implemented method as defined in any of paragraphs 1-4, wherein an axis of the electronic device is positioned perpendicular to and axis of the drill string when obtaining the first and second orientation values.

6. The computer-implemented method as defined in any of paragraphs 1-5, wherein the electronic device is positioned in a holding device which orients the electronic device at a known axis in relation to the motor and MWD assembly when obtaining the first and second orientation values.

7. The computer-implemented method as defined in any of paragraphs 1-6, further comprising scanning a barcode on the drill string in order to confirm an identity of the motor or MWD assembly.

8. The computer-implemented method as defined in any of paragraphs 1-7, wherein the motor highside reference point is determined by: placing a first scribe line on the drill string which corresponds to the motor highside; placing the first scribe line level with a rig floor; and placing a second scribe line on the rig floor adjacent the first scribe line; the first orientation value is obtained by: attaching the electronic device to a third scribe line on the drill string which corresponds to the MWD assembly highside; and recording a position of the third scribe line as the first orientation value; and the second orientation value is obtained by: positioning the electronic device such that it is adjacent the rig floor; rotating the drill string until third scribe line is aligned with the second scribe line on the rig floor; and after the rotation, recording a position of the electronic device as the second orientation value.

9. The computer-implemented method as defined in any of paragraphs 1-8, further comprising steering, in response to the angular offset, the drill string.

10. A system to determine an angular offset between reference points on a drill string, the system comprising a bottomhole assembly ("BHA"); and an electronic device having processing circuitry therein to determine orientation values by: obtaining, using the electronic device positioned adjacent to a first highside reference point, a first orientation value corresponding to the first highside reference point; obtaining, using the electronic device positioned adjacent to a second highside reference point, a second orientation value corresponding the second highside reference point; and calculating, using the electronic device, an angular offset between the first and second orientation values.

11. A system as defined in paragraph 10, wherein the first highside reference point is a motor highside reference point; and the second highside reference point is a measurement-while-drilling ("MWD") assembly highside reference point.

12. The system as defined in paragraphs 10 or 11, further comprising a holding device to orient the electronic device at a known axis in relation to the motor and MWD assembly when obtaining the first and second orientation values.

13. The system as defined in any of paragraphs 10-12, wherein the electronic device is a hand-held device.

14. The system as defined in any of paragraphs 10-13, wherein the electronic device comprises at least one of a magnetometer, accelerometer, gyro, rotational vector sensor, or global positioning system ("GPS").

15. The system as defined in any of paragraphs 10-14, wherein the motor highside reference point is determined by: placing a first scribe line on the drill string which corresponds to the motor highside; placing the first scribe line level with a rig floor; and placing a second scribe line on the rig floor adjacent the first scribe line; the first orientation value is obtained by: attaching the electronic device to a third scribe line on the drill string which corresponds to the MWD assembly highside; and recording a position of the third scribe line as the first orientation value; and the second orientation value is obtained by: positioning the electronic device such that it is adjacent the rig floor; rotating the drill string until third scribe line is aligned with the second scribe line on the rig floor; and after the rotation, recording a position of the electronic device as the second orientation value.

Furthermore, the exemplary methodologies described herein may be implemented by a system including processing circuitry or a non-transitory computer program product including instructions which, when executed by at least one processor, causes the processor to perform any of the methodology described herein.

Although various embodiments and methodologies have been shown and described, the invention is not limited to such embodiments and methodologies and will be understood to include all modifications and variations as would be apparent to one skilled in the art. Therefore, it should be understood that the invention is not intended to be limited to the particular forms disclosed. Rather, the intention is to cover all modifications, equivalents and alternatives falling within the spirit and scope of the invention as defined by the appended claims.

What is claimed is:

1. A computer-implemented method for determining an angular offset between reference points on a drill string, the method comprising:
    positioning an electronic device adjacent a first highside reference point;
    obtaining, using the electronic device, a first orientation value corresponding to the first highside reference point;
    moving the same electronic device adjacent a second highside reference point;
    obtaining, using the electronic device, a second orientation value corresponding the second highside reference point; and
    calculating, using the electronic device, an angular offset between the first and second orientation values.

2. The computer-implemented method as defined in claim 1, wherein:
    the first highside reference point is a motor highside reference point; and
    the second highside reference point is a measurement-while-drilling ("MWD") assembly highside reference point.

3. The computer-implemented method as defined in claim 2, wherein the electronic device is a hand-held device.

4. The computer-implemented method as defined in claim 2, wherein the electronic device comprises at least one of a magnetometer, accelerometer, gyro, rotational vector sensor, or global positioning system ("GPS").

5. The computer-implemented method as defined in claim 2, wherein an axis of the electronic device is positioned perpendicular to an axis of the drill string when obtaining the first and second orientation values.

6. The computer-implemented method as defined in claim 2, wherein the electronic device is positioned in a holding device which orients the electronic device at a known axis in relation to a motor and MWD assembly when obtaining the first and second orientation values.

7. The computer-implemented method as defined in claim 2, further comprising scanning a barcode on the drill string in order to confirm an identity of a motor or MWD assembly.

8. The computer-implemented method as defined in claim 2, wherein:
    the motor highside reference point is determined by:
        placing a first scribe line on the drill string which corresponds to a motor highside;
        placing the first scribe line level with a rig floor; and
        placing a second scribe line on the rig floor adjacent the first scribe line;
    the first orientation value is obtained by:
        attaching the electronic device to a third scribe line on the drill string which corresponds to a MWD assembly highside; and
        recording a position of the third scribe line as the first orientation value; and
    the second orientation value is obtained by:
        positioning the electronic device such that it is adjacent the rig floor;
        rotating the drill string until the third scribe line is aligned with the second scribe line on the rig floor; and
        after the rotation, recording a position of the electronic device as the second orientation value.

9. The computer-implemented method as defined in claim 2, further comprising steering, in response to the angular offset, the drill string.

10. A non-transitory computer program product including instructions which, when executed by at least one processor, causes the at least one processor to perform a method comprising:
    obtaining, using an electronic device positioned adjacent a first highside reference point, a first orientation value corresponding to the first highside reference point;
    obtaining, using the same electronic device moved adjacent a second highside reference point, a second orientation value corresponding the second highside reference point; and
    calculating, using the electronic device, an angular offset between the first and second orientation values.

11. The computer program product as defined in claim 10, wherein:
    the first highside reference point is a motor highside reference point; and
    the second highside reference point is a measurement-while-drilling ("MWD") assembly highside reference point.

12. The computer program product as defined in claim 11, wherein the electronic device is positioned in a holding device which orients the electronic device at a known axis in relation to a motor and MWD assembly when obtaining the first and second orientation values.

13. The computer program product as defined in claim 11, further comprising scanning a barcode on a drill string in order to confirm an identity of a motor or MWD assembly.

14. The computer program product as defined in claim 11, wherein:
    the motor highside reference point is determined by:
        placing a first scribe line on a drill string which corresponds to a motor highside;
        placing the first scribe line level with a rig floor; and
        placing a second scribe line on the rig floor adjacent the first scribe line;
    the first orientation value is obtained by:
        attaching the electronic device to a third scribe line on the drill string which corresponds to a MWD assembly highside; and
        recording a position of the third scribe line as the first orientation value; and
    the second orientation value is obtained by:
        positioning the electronic device such that it is adjacent the rig floor;
        rotating the drill string until the third scribe line is aligned with the second scribe line on the rig floor; and
        after the rotation, recording a position of the electronic device as the second orientation value.

15. A system to determine an angular offset between reference points on a drill string, the system comprising:
    a bottom hole assembly ("BHA"); and
    an electronic device having processing circuitry therein to determine orientation values by:
        obtaining, using the electronic device positioned adjacent to a first highside reference point, a first orientation value corresponding to the first highside reference point;
        obtaining, using the same electronic device moved adjacent to a second highside reference point, a second orientation value corresponding the second highside reference point; and calculating, using the electronic device, an angular offset between the first and second orientation values.

16. The system as defined in claim 15, wherein:
the first highside reference point is a motor highside reference point; and
the second highside reference point is a measurement-while-drilling ("MWD") assembly highside reference point.

17. The system as defined in claim 16, further comprising a holding device to orient the electronic device at a known axis in relation to a motor and MWD assembly when obtaining the first and second orientation values.

18. The system as defined in claim 16, wherein the electronic device is a hand-held device.

19. The system as defined in claim 16, wherein the electronic device comprises at least one of a magnetometer, accelerometer, gyro, rotational vector sensor, or global positioning system ("GPS").

20. The system as defined in claim 16, wherein the motor highside reference point is determined by:

placing a first scribe line on the drill string which corresponds to a motor highside;
placing the first scribe line level with a rig floor; and
placing a second scribe line on the rig floor adjacent the first scribe line;
the first orientation value is obtained by:
attaching the electronic device to a third scribe line on the drill string which corresponds to a MWD assembly highside; and
recording a position of the third scribe line as the first orientation value; and
the second orientation value is obtained by:
positioning the electronic device such that it is adjacent the rig floor;
rotating the drill string until the third scribe line is aligned with the second scribe line on the rig floor; and
after the rotation, recording a position of the electronic device as the second orientation value.

* * * * *